June 22, 1948.  J. Y. SNYDER  2,443,995
MOVEMENT CONTROLLING APPARATUS
Filed March 19, 1946
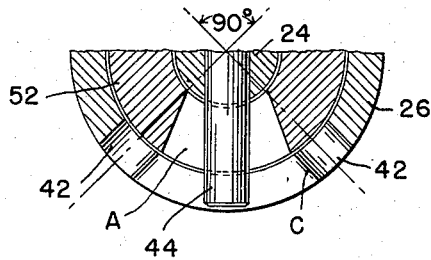
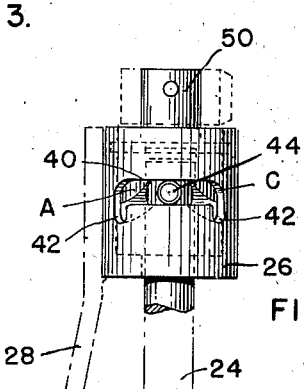
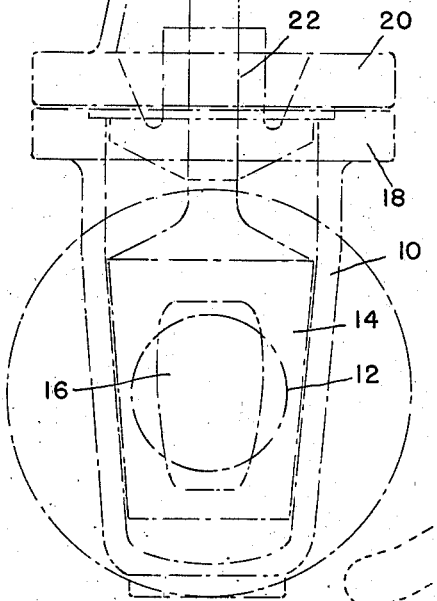
Inventor
JOHN Y. SNYDER
Cushman Darby Cushman
Attorneys Patented June 22, 1948

2,443,995

UNITED STATES PATENT OFFICE 2,443,995

MOVEMENT CONTROLLING APPARATUS

John Y. Snyder, New Orleans, La., assignor, by mesne assignments, to Louisiana Savings Bank & Trust Company, New Orleans, La., a banking institution of Louisiana Application March 19, 1946, Serial No. 655,554

15 Claims. (Cl. 74—22)

The present invention relates to apparatus for applying controlled movements to an element, such as, for example, to the valve member of a plug or other type valve. While the invention is described and illustrated in connection with the operation of a plug type valve, it will be understood that the embodiment disclosed or modifications thereof may be employed to control the movements of other elements.

In the present disclosure, the movements illustrated are movements of translation and rotation of a rod or shaft, there being separate movements of translation before and after a rotational movement of the shaft. These movements are shown as applied to the stem of a plug valve to first lift the plug from its seat, then turn it around its axis to change the position of the valve, as by moving it between open and closed positions, and finally to return the plug to its seat with a final translational movement of the stem. It will be obvious that by suitable modification of the design, other movements might be imparted to a valve stem, or movements of a different character might be applied to an element not employed to control such as a valve.

As applied to a valve or similar device, one of the objects of the invention is to provide apparatus for effecting the movements described, which is of simple and economical construction, and characterized by the use of only a minimum number of parts. In connection with this objective, the simplicity of the construction and of the various parts which make up the apparatus is of great advantage where the valve is used under conditions where mud and sand might cause the parts to gall and bind.

Another object of the invention is to accomplish the purposes referred to above by apparatus which is self-contained and characterized by the absence of protruding parts susceptible to damage.

Other objects and advantages of the invention will become apparent as the description herein progresses.

In the drawings, which are illustrative and which are not intended to restrict the invention other than as defined in the claims:

Figure 1 is a side elevational view showing apparatus of the invention applied to the operation of a valve of the plug type.

Figure 2 is an enlarged side elevational view of the essential parts of the invention, partly in section, disclosing the intersecting relation of the actuating and control cams or tracks.

Figure 3 is a partial lateral sectional view of the device, taken along the line 3—3 of Figure 2.

Figures 4 through 7 inclusive are diagrammatic views illustrating the manner of operation of the actuating and control cams or tracks in moving a valve stem or other element through the desired paths of movement.

Throughout the specification and claims, such terms as inward and outward, or horizontal and vertical, are used to define the relation of the elements as shown in the drawings, and are not intended to indicate restriction of the use of the invention or the scope of the claims to any particular position of the mechanism with respect to the device whose movement is being controlled.

Referring to Figure 1, a valve body is shown at 10, said body having a passage or fluid way 12 controlled by a plug 14 having an opening 16 therethrough which is adapted to be aligned with the passage 12 to permit flow of fluid through the valve. It will be understood that in the design shown the plug 14 is adapted to be rotated through 90° to remove its opening 16 from registry with the passage 12 in order to close the valve against flow of fluid therethrough. While only a simple valve is shown, the invention is obviously applicable to valves of more complex type. For example, the invention could be designed for use with a valve having a plug which is selectively moved to establish communication between two of a series of three or more passages connecting with the valve.

As shown in Figure 1, the interior of the valve body 10 is of general conical form, and the plug 14 is of similar configuration. In the operation of such valves, it is usually necessary to first unseat the valve by longitudinal movement of the valve stem, in order that the plug may be freely turned. After completion of the turning operation, it is usually desired to again move the valve member longitudinally of its axis in order to firmly seat it and thus form a tight seal between the valve plug and body.

The valve body is provided with an open end surrounded by a connecting flange 18, and a similarly flanged cap plate or bonnet 20 is secured as by bolts to the open end of the valve body. The cap or bonnet has a central aperture 22 therethrough adapted to pass the valve stem 24 which may be flexibly pivoted to the plug 14 to permit movement in any direction for the purposes of alignment, but which imparts to the plug 14 all of the movements of the stem 24. As is well known in the art of valves, suitable stuffing box packing arrangements (not shown) may be provided in the opening or passage through the bonnet 20 in order to form a seal with the stem 24 while permitting the latter to move with respect to and through the bonnet.

The important features of the invention are best shown in Figure 2, comprising a guide member or casing 26 which carries the operating elements of the invention, said guide member being held in fixed relation at any selected distance from the valve body and plug by one or more brackets 28. The bracket 28 is rigidly secured to the valve body or to its bonnet 20 at one end of the bracket and to the guide member or housing 26 adjacent the other end of the bracket.

The fixed guide or sleeve is shown in the form of a cup-shaped member having an inside cylindrical bore 30 throughout the major portion of its length closed by a bottom plate 32 having a central aperture 33 therethrough of size to permit passage of the upper end 34 of the valve stem 24. The movements of the stem 24 when opening or closing the valve comprise an initial translational or outward axial movement to unseat the valve, a turning movement between closed and open positions, of the valve, and a final translational axial movement of the stem 24 toward the valve seat to reseat the plug.

The movements just described are controlled by a cam track C formed in the longitudinal wall of the housing 26, said track having a straight circular section 40 between end axial sections 42 constituting extensions from the intermediate circular portion 40, the entire cam track being of substantially U-shaped configuration. This cam track guides stem 24 in its movements by means of a round pin 44 fixed in and extending outwardly from the upper end 34 of the valve stem. The pin 44 is of diameter substantially equal to the width of the cam groove in the wall of the housing 26 in order that the pin may be firmly guided in said groove. It will be apparent that when the pin 44 is positioned in one of the axial end portions 42 of the cam track, the valve plug 14 is in engagement with its seat, either in closed or open position. It will be likewise apparent that when the pin 44 is in the lateral or circular portion of the cam groove in the housing 26, the valve stem 24 has had translational movement imparted thereto moving the valve plug 14 outwardly from its seat to permit free turning of the valve member without undue wear of its contacting surfaces.

The pin 44 and the valve stem 24 are caused to move in the fixed cam track by an actuating member 50, comprising an operating shaft extending beyond the outer end of the housing 26 and a cylindrical sleeve 52 depending from the shaft 50 and disposed within the chamber 30 of said housing. Any suitable handle, wheel, driven gear or the like may be applied to the outer end of the member 50. The sleeve 52 has an outer diameter slightly less than the diameter of the bore 30 of the housing and it has an end face 54 which abuts and turns against the inner face of the bottom plate 32 of the housing. The sleeve portion 52 has an inner central cavity 56 which fits over the upper end 34 of the valve stem 24, there being sufficient head space provided to permit translational movement of the end portion 34 of the stem within the bore of the sleeve 52. The sleeve 52 is retained in place in said bore by a sectional circular member 60 which fits into a circular groove 62 in the bore 30 adjacent the outer open end thereof. The ring sections 60 are retained in the groove 62 by a spring ring 64 which is snapped into suitable grooves in the inner walls of the sectional members 60.

The sleeve 52 is also provided with an actuating cam track or slot A as best shown on the right hand side of Figure 2, said track having a short central circular portion 68 and slanting end portions 70, the end portions gradually rising toward the central portion 68. The axial amplitude of the cam slot A is equal to that of the cam slot C, but the portions 70 rise gradually from their outer to their inner ends, as distinguished from the straight axial direction of the portions 42 of the slot C. The width of the actuating cam track A is also substantially equal to the diameter of the pin 44, so that when turning movement is imparted to the sleeve 52 from its operating shaft 50, the pin 44 is caused to move relatively along the actuating cam track 70. The pin 44 is inserted through the two cam tracks and fixed into the stem 24 after the sleeve 52 is inserted into the housing 26.

As disclosed in the drawings, the actuating cam track A in the sleeve 52 is immediately behind and within the fixed guiding cam track C in the housing 26. As the sleeve 52 turns within said housing and around the upper end 34 of the valve stem 24, the track A moves across the lateral dimension of the track C. When the sleeve 52 is turned, the opposed outer and inner surfaces of the actuating cam track cause axial or translational and rotational movements of the pin 44, but these movements are confined or controlled by the fixed cam track in the housing 26 to the path of movements defined by that track.

Figures 4 through 7 are illustrative of the manner in which the respective cam tracks cooperate to impart translational and rotational movements to the valve stem 24. Commencing with Figure 4, it may be assumed that the valve plug 14 is seated with the valve turned to its open position. At this time the valve stem 24 is adjacent its innermost position and the pin 44 is in the inner right hand end of section 42 of the control cam track C, the sleeve 52 having previously been turned counter-clockwise to substantially its maximum extent to place pin 44 in the lower left hand end of the slanting sections of the cam track A.

When it is desired to open the valve, the operating shaft 50 is turned in a clockwise direction by any suitable handle or other means for application of power, and such movement causes the actuating cam track A to move toward the left in the direction of the arrow shown in Figure 4. Initially, the right hand axial portion of the control cam track C prevents any lateral or rotational movement of the pin 44, as the inner side wall 71 of that portion of the track restrains any movement of the pin 44 around the axis of the stem 24. However, as the cam track A is moved to the left, its gradually tapering inner surface 72 sweeps beneath the pin 44 and causes the latter to move outwardly in the side leg of the fixed guide cam C until said pin has reached the circular portion 40 of said track, as shown in Figure 5. Further movement of the sleeve 52 in a clockwise direction continues the movement of the cam track A to the left until its upper gradually tapering surface 76 contacts the pin 44, and thereafter said surface sweeps the pin circularly through the intermediate portion of the control track C, to the position of said pin as illustrated in Figure 6.

During the stage of movement just mentioned, it will be understood that the valve stem 24 is turned around its axis, to move the port 16 in the valve plug through approximately 90° until it is out of register with the passage 12 through the valve body. Previous to this movement, the outward movement of the pin 44 in the right hand leg of the control track would have lifted the plug 14 from its seat.

Returning to Figure 6, subsequent clockwise movement of the sleeve 52 continues to force pin 44 to the left until said pin is in the left hand leg of the control cam C, at which time the surface 76, as it sweeps past the pin 44, forces the pin inwardly into the left hand leg of the control cam C to the final position shown in Figure 7, thus again sealing the plug 14 into its seat with pressure.

It will be obvious that the pin 44 may be moved from its position of Figure 7 to its position of Figure 4, to again open the valve, by a reverse process from that just described. In this reverse movement, the surface 78 of the groove A performs in the same manner as the surface 72, as previously described, while the surface 80 of said cam track performs in a manner similar to the surface 76 as previously described.

During the stages of operation described above, the cooperation of tracks A and C to effect the desired movements of the elements 44 and 24 will be noted. In the first stage, the track A applies force to the pin 44 both laterally and outwardly, but the track C confines the resulting movement in an outward axial direction only. During the intermediate stage, track A presses pin 44 both laterally and inwardly, but track C confines the resulting movement to a lateral direction only, which appears as a turning movement of stem 24. During the final stage, while track A tends to force pin 44 both laterally and inwardly, track C confines the direction to inward movement only.

While I have shown the control track C extending circularly through substantially 90°, and the actuating track similarly extending through substantially 120°, it will be obvious that the design of these tracks may be varied as necessary in order to provide greater or lesser lateral or circular movements of the valve stem 24 or other element. Similarly the design may be modified to provide for greater or lesser translational movements of the element or stem 24.

In the case of valves, the cam tracks should be so designed, in cooperation with the arrangement of the valve stem, valve member and its seat, so that when the valve is initially positioned, it will rest on its seat prior to the time when the pin 44 reaches the ends of either of the legs of the control track C, in order to provide for further movement of the pin and the valve member toward its seat to accommodate for wear of the engaging parts of the valve. In this connection, the valve plug should be seated prior to the time when pin 44 has reached the end of the cam track A, in order to permit further movement when the valve parts become worn, and also so that the final operating portion of the cam track A may be used to tightly press the valve against its seat. That is, the final action of the terminal portions 76 and 80 of the actuating cam A operate to tightly press and lock the valve against its seat, and this action is accomplished prior to the time when the pin 44 has reached the ends of the cam tracks.

By the above construction and design, complicated adjustment mechanisms for the valve and its operating parts are avoided.

Referring to Figure 4, it will be apparent that relatively slow acting lifting force with pronounced mechanical advantage is applied to the pin 44 to lift the valve plug or other element. During the stages of movement illustrated by Figures 5 and 6, the pin 44 is supported in the lateral portion of track C and fast lateral or circular movement requiring only relatively low power application results. In the final stage portrayed by Figure 7, the element 24 is pressed down slowly, while being supported until it reaches its seat, by slow movement while pronounced mechanical advantage is present.

It will be apparent that the construction described herein is of quite simple character, and that there are no threads or similar delicate parts which might be clogged with such as sand and mud. As previously mentioned, the working parts are all well housed and protected within the casing 26, and thus free from damage.

It will be obvious that the present invention, while particularly adapted for use in connection with valves of the plug type, would also, by suitable modification, be applicable to any other instances where it is desired to effect translational and rotary movements of an element, or to situations where it is desired to impart to an element axial or straight line movements, as well as a movement in a direction different from that of the first or final movements. It will also be apparent that the mechanism described provides a convenient indicator to disclose the condition or positions of a valve member or the like.

I claim:

1. In a device of the character described, an element arranged for successive movements in two directions at an angle to one another, said element having a projection thereon to which force may be applied to cause said movements, a fixed control member having a guide track therein with engaging surfaces for said projection for governing the direction and extent of said movements, a driving member positioned adjacent said control member and arranged for movement with respect thereto, said driving member having an actuating track therein which moves past said guide track when said driving member is moved with respect to said fixed member, said actuating track also having engaging surfaces for said projection, said projection being arranged to extend into both of said tracks whereby it is moved by the engaging surfaces of said movable track under directional control of the engaging surfaces of said fixed track.

2. In a device of the character described, an element adapted for an initial movement and for a succeeding movement in a direction at an angle to said first direction of movement, a control member having a guiding cam track therein, a second member having an actuating cam track therein, said members being adapted for relative movement with respect to one another whereby one of said tracks moves substantially throughout the extent of the other, said element having a portion thereof extending into and engaging the surfaces of each of said tracks, said actuating track having opposite surfaces capable of forcing said portion of said element in said successive directions, said guiding track being formed to confine the movements of said portion of said element and to thereby bring said opposite surfaces of said actuating track into play against said portion of said element to move said element first in one direction and thereafter in the direction at an angle to the initial direction of movement.

3. In a device of the character described, an element adapted for an initial movement and for a succeeding movement in a direction at substantially right angles to said first direction of movement, a control member and a second member mounted for relative movement with respect to one another and having respectively a guiding cam track and an actuating cam track which move past one another during the relative movements of said members, said element having a portion thereof which extends into and engages the surfaces of each of said tracks, said guiding track comprising an initial section which confines said follower against other than one direction of movement and thereby brings into play one surface of said actuating cam track to move said element in said one direction, said guide track having a further section at substantially right angles to said initial section which confines said follower against movement other than in its direction thereby bringing into play another surface of said actuating cam to move said element in said last-named direction.

4. In a device of the character described, a stem adapted for successive axial and turning movements and having a projection thereon for application of force to cause said movements, means for operating said stem comprising concentric control and actuating sleeves surrounding said stem and arranged for relative turning movement with respect to one another, said sleeves having respective guiding and actuating cam tracks which face one another and with each of which the projection on said stem is in engagement, said actuating cam track having surfaces which are brought into play successively by the surfaces of said control cam track to move said projection through said control cam track in the successive directions defined by said track, the latter being formed to require successive axial and turning movements of said stem.

5. In a device of the character described, a rod adapted for successive axial and turning movements, a control member and a second member adapted for relative movement with respect to one another and having respective guiding and actuating cam tracks therein which pass one another during said relative movement, said rod having a cam follower thereon which engages each of said tracks, said guide track having an axial section which confines the movement of said follower and brings one surface of said actuating cam track into play against said follower to move said rod axially, and another section at substantially right angles to said first section to confine the movement of said follower and bring an opposing surface of said actuating cam track into play against said follower to impart turning movement to said rod.

6. In a device of the character described, a rod adapted for successive axial and turning movements, a control member and a second member adapted for relative movement with respect to one another and having respective guide and actuating cam tracks therein which pass one another during said relative movement, said rod having a cam follower thereon which engages each of said tracks, said guide track having an intermediate section which confines said follower to turning movement and brings a surface of said actuating cam track into play against said follower to cause such movement of said rod, and end sections which confine said follower to axial movement and which bring other surfaces of said actuating cam track into play against said follower to cause axial movement of said follower and said rod.

7. In a device of the character described, a rod adapted for successive axial and turning movements, a control member and a second member mounted on a support for relative movement with respect to one another and having respective guiding and actuating cam tracks therein which pass one another during said relative movement, said tracks being of substantially equal amplitude axially of said rod, said guiding cam being of substantially U shape and said actuating cam being of substantially shallow V configuration, said actuating cam tending to impart both axial and turning movements to said rod while said guiding cam confines the movement of said rod solely to successive substantially axial and turning movements.

8. In a device of the character described, a guide member having a control cam track therein, a second member having an actuating cam track therein, said members being mounted for relative movement adjacent one another whereby one cam track moves past the other, a stem having a device adjacent an end thereof which is spaced from said cam tracks and which performs work by successive axial and lateral movements of said device, said stem having a cam follower thereon adjacent its other end which extends into both of said tracks, said actuating cam track having a surface which presses said follower in a direction to impart both lateral and axial movements to said device when said members are relatively moved with respect to one another, and said control cam track having a surface which restrains said follower in its movement to confine said device to axial movement only during a portion of the relative movement between said members.

9. In a device of the character described, a guide member having a control cam track therein, a second member having an actuating cam track therein, said members being mounted for relative movement adjacent one another whereby one cam track moves past the other, a stem having a device adjacent an end thereof which is spaced from said cam tracks and which performs work by successive axial and lateral movements of said device, said stem having a cam follower thereon adjacent its other end which extends into each of said tracks, said actuating cam track having a surface which presses said follower in a direction to impart both lateral and axial movements to said device when said members are relatively moved with respect to one another, and said control cam track having a surface which restrains said follower in its movement to confine said device to lateral movement only during a selected part of the relative movement of said members with respect to one another.

10. In a device of the character described, a guide member having a control cam track therein, a second member having an actuating cam track therein, said members being mounted for relative movement adjacent one another whereby one cam track moves past the other, a stem having a device adjacent an end thereof which is spaced from said cam tracks and which performs work by successive axial and lateral movements of said device, said stem having a cam follower thereon adjacent its other end which extends into both of said tracks, said actuating cam track having a surface which presses said follower in a direction to impart both lateral and axial movements to said device when said members are moved with respect to one another, and said control cam having surfaces which successively restrain said follower in its movements to confine said device first to axial movement only and thereafter to lateral movement only during selected portions of the relative movement between said members.

11. In a device of the character described, a guide member having a control cam track therein, a second member having an actuating cam track therein, said members being mounted for relative movement adjacent one another whereby one cam track moves past the other, a stem having a device adjacent an end thereof which is spaced from said cam tracks and which performs work by successive outward, lateral and inward movements of said device, said stem having a cam follower thereon adjacent its other end, which extends into both of said tracks, said actuating cam track having a surface which presses said follower in a direction to impart both lateral and inward and outward axial movements to said device when said members are moved with respect to one another, and said control cam track having surfaces which succssively restrain said follower in its movements to confine said device solely to lateral movement during a selected part of the relative movement of said members, and solely to inward and outward movements prior to and after the lateral movement of said device.

12. In a device of the character described, a cylindrical guide member having a control cam track therein, a second member arranged concentrically with respect to said guide member having an actuating cam track therein, said members being mounted for relative turning movement with respect to one another whereby one cam track rotates past the other, a stem having a portion thereof passing into said members and having a device adjacent an end thereof, spaced from said cam tracks and which performs work by successive axial and turning movements of said device, said stem having a cam follower thereon adjacent its other end which extends into both of said tracks, said actuating cam track having a surface which urges said follower in a direction to impart both axial and turning movements to said device when said members are moved with respect to one another, and said control cam track having a surface which restrains said follower in its movement to confine said device to axial movement only during selected portions of the relative movement between said members.

13. A device of the character described, a fixed cylindrical guide member having a control cam track therein, a second member arranged concentrically with respect to said guide member having an actuating cam track therein and mounted for movement whereby said actuating cam track moves past said control cam track, a stem having an end extending at least partially through said members and having a device adjacent its other end which performs work by successive axial and turning movements of said device, said stem having a cam follower thereon adjacent its first-mentioned end which extends into both of said tracks, said actuating cam track having a surface which presses said follower in a direction to impart both turning and axial movements to said device when said second member is moved with respect to said guide member, and said control cam track having a surface which simultaneously restrains said follower in its movement to confine said device to a turning movement only during a selected part of the movement of said second member with respect to said guide member.

14. In a device of the character described, concentrically arranged guide and second members having respectively a control cam track and an actuating cam track therein, said members being mounted for relative rotational movement with respect to one another whereby one cam track moves past the other, a stem extending at least partially through said members and having a device adjacent an end thereof spaced from said cam tracks and which performs work by successive axial and turning movements of said device, said stem having a cam follower thereon, adjacent its other end which extends into each of said tracks, said actuating cam track having a surface which presses said follower in a direction to impart both axial and turning movements to said device when said members are relatively rotated with respect to one another, and said control cam track having a surface which successively restrains said follower in its movement to confine said device first to axial movement only and then to turning movement only during selected portions of said relative movement of said members.

15. In a device of the character described, concentric guide and second members having respectively a control cam track and an actuating cam track therein, said members being mounted for relative movement with respect to one another whereby one cam track sweeps past the other, a stem having a portion thereof in concentric relation with respect to said members and having a device adjacent an end thereof which is spaced from said cam track and which performs work by successive outward, turning and inward movements of said device, said stem having a cam follower therein which extends into each of said tracks, said actuating cam track having a surface which presses said follower in a direction to impart both inward and outward and turning movements to said device when said members are moved with respect to one another, and said control cam track having surfaces which successively restrain said follower in its movement to confine said device successively to outward, turning, and inward movements.

JOHN Y. SNYDER.

REFERENCES CITED

The following references are of record in the file of this patent:

UNITED STATES PATENTS

| Number | Name | Date |
|--------|------|------|
| 1,892,574 | Huhn | Dec. 27, 1932 |
| 2,412,529 | Mueller | Dec. 10, 1946 |